Aug. 20, 1963 A. C. BENNETT 3,101,389
DIVIDED ELECTRICAL INSULATOR
Filed June 13, 1962 7 Sheets-Sheet 1

INVENTOR.
ARTHUR C BENNETT
BY

Aug. 20, 1963 A. C. BENNETT 3,101,389
DIVIDED ELECTRICAL INSULATOR
Filed June 13, 1962 7 Sheets-Sheet 2
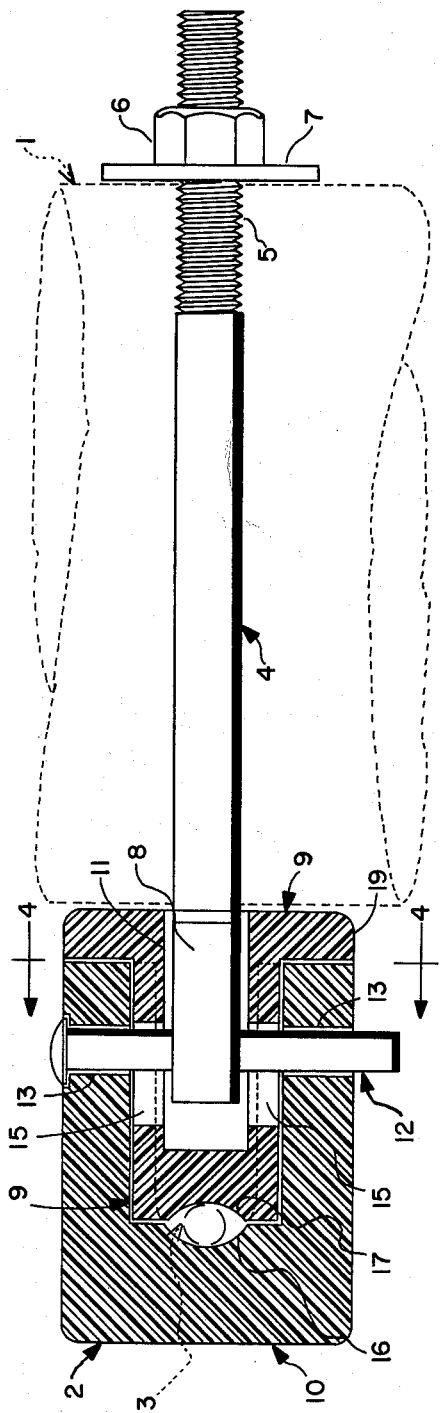
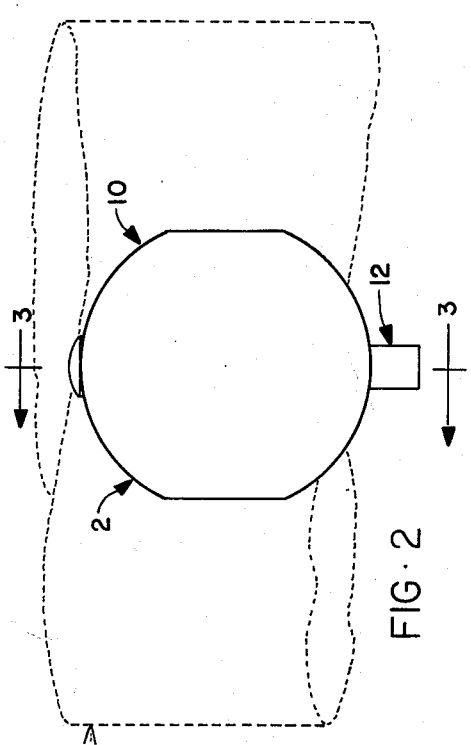
FIG. 2
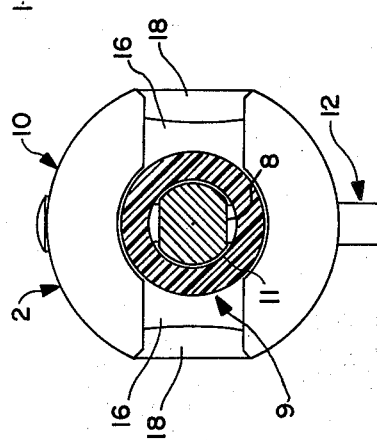
FIG. 4
INVENTOR
ARTHUR C BENNETT
BY

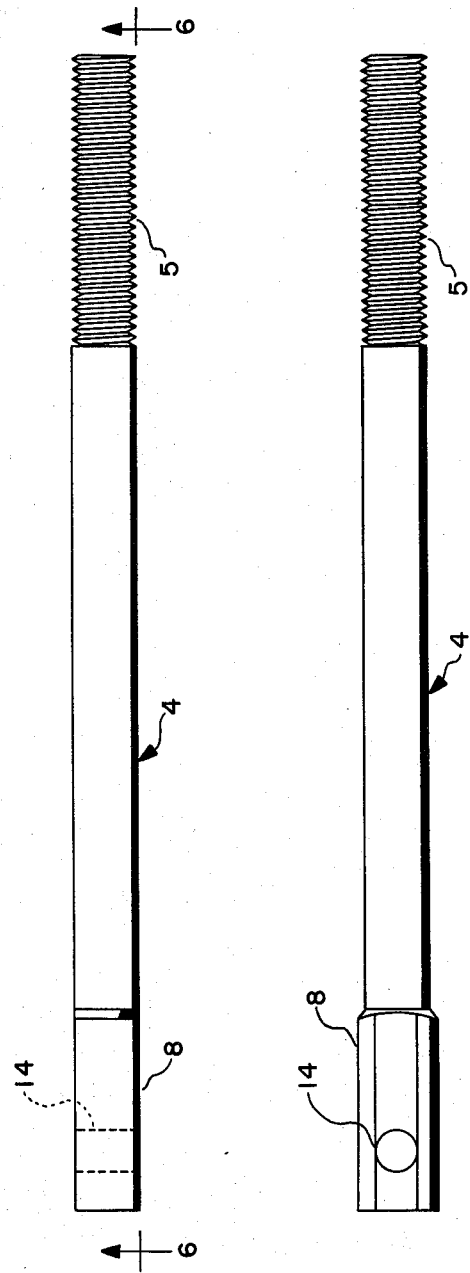

Aug. 20, 1963        A. C. BENNETT        3,101,389
DIVIDED ELECTRICAL INSULATOR
Filed June 13, 1962        7 Sheets-Sheet 4

INVENTOR.
ARTHUR C BENNETT
BY

Aug. 20, 1963 A. C. BENNETT 3,101,389
DIVIDED ELECTRICAL INSULATOR
Filed June 13, 1962 7 Sheets-Sheet 5
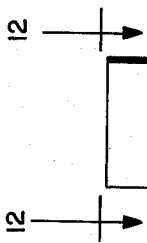
FIG·13
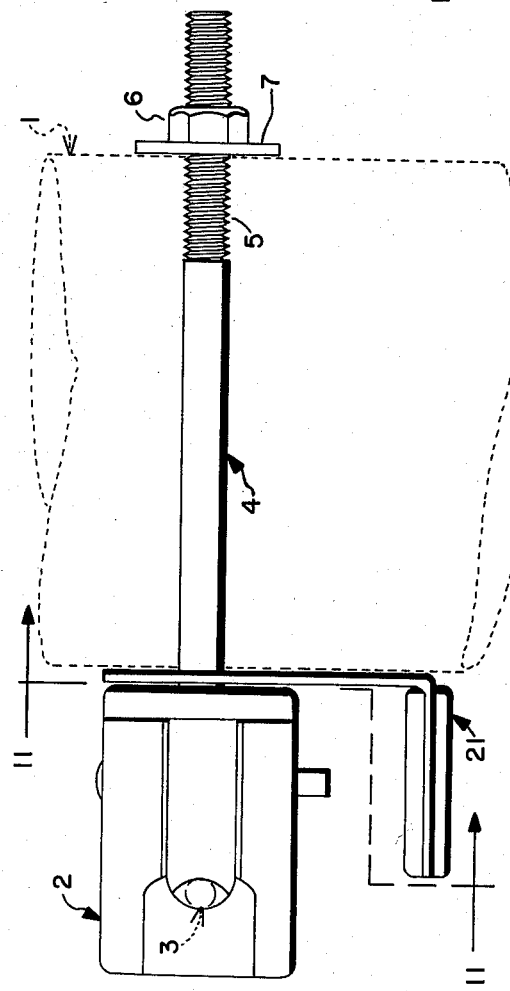
FIG·10
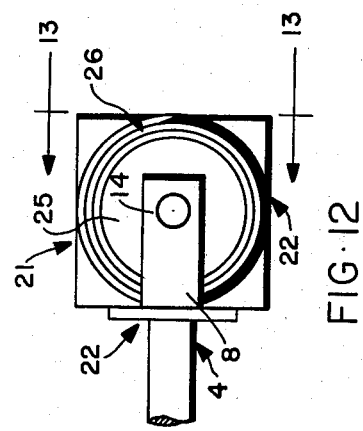
FIG·12
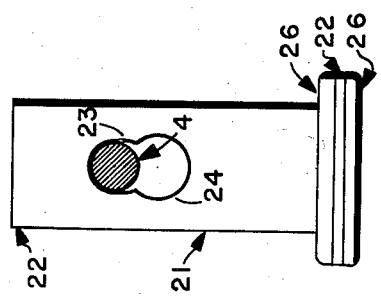
FIG·11
INVENTOR.
ARTHUR C BENNETT
BY Aug. 20, 1963

A. C. BENNETT 3,101,389

DIVIDED ELECTRICAL INSULATOR

Filed June 13, 1962

INVENTOR.
ARTHUR C BENNETT
BY

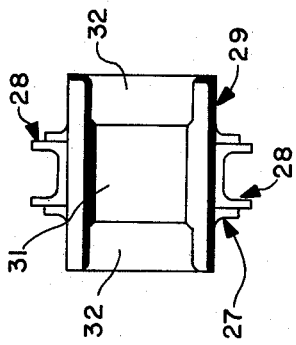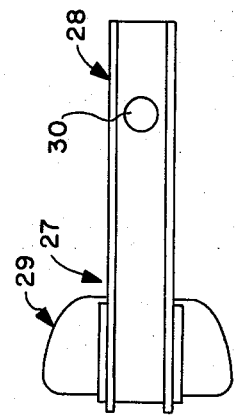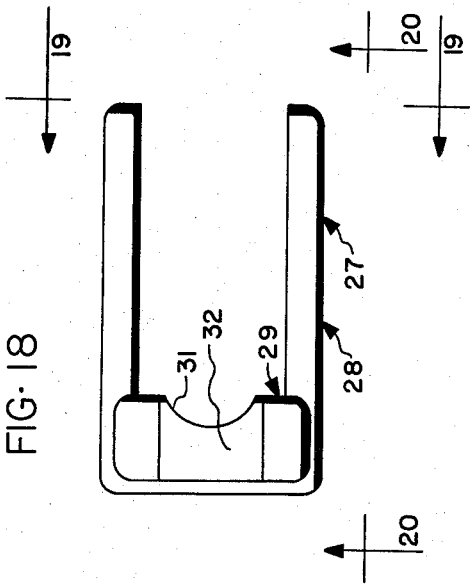

United States Patent Office 3,101,389
Patented Aug. 20, 1963

3,101,389
DIVIDED ELECTRICAL INSULATOR
Arthur C. Bennett, P.O. Box 86, Rhome, Tex.
Filed June 13, 1962, Ser. No. 202,234
4 Claims. (Cl. 174—156)

This invention concerns an electrical insulator for attachment of a power line to a pole, and is intended more particularly for use in attaching a secondary line directly to one side of the pole.

Electrical insulators as heretofore employed for the purpose described are formed partly of breakable material, and the insulators themselves as well as the wire connections, including the conductors and the shields and armor rods whereby the conductors are secured to the insulators, are subject to deterioration due to fatigue resulting from vibration as well as breakage. Moreover, the cost of labor and materials which ordinarily is involved in providing such insulators and attaching them to the poles, and for attaching the conductors to the insulators whereby they are protected against fatigue and damage from other causes is substantial.

An object of this invention is to provide such an insulator which is characterized by its simplicity and by its novel construction whereby it may be readily secured to a pole and removed therefrom, and having means for conveniently securing a conductor thereto, and which does not require additional shielding or armor means for protecting the conductor against damage or deterioration due to vibration or from other causes after it has been installed, and which is of durable construction and is further characterized by its toughnesss and its resistance to deterioration or breakage from any cause and which will last indefinitely.

The invention will be readily understood by referring to the following description and the accompanying drawing, in which:

FIG. 2 is an end view of the insulator taken on the line 2—2 of FIG. 1, showing the pole fragmentarily in dotted lines;

FIG. 3 is a longitudinal sectional view taken on the line 3—3 of FIG. 2;

FIG. 4 is a transverse sectional view taken on the line 4—4 of FIG. 3;

FIGS. 5 and 6 are longitudinal views showing details of construction of a bolt whereby the insulator is connected to the pole;

FIG. 10 is a view similar to FIG. 1 showing the addition of a bracket whereby a service line, which is to be connected to the electrical conductor, is adapted to be anchored to the pole;

FIGS. 11 to 13 are views showing details of construction of the bracket and its relation to the bolt whereby the insulator is secured to the pole;

FIG. 18 is a side view showing a modified form of the bifurcated outer clamping element shown in FIGS. 1 to 4;

FIG. 19 is an end view taken on the line 19—19 of FIG. 18; and

FIG. 20 is a longitudinal view taken on the line 20—20 of FIG. 18.

Figure 1:
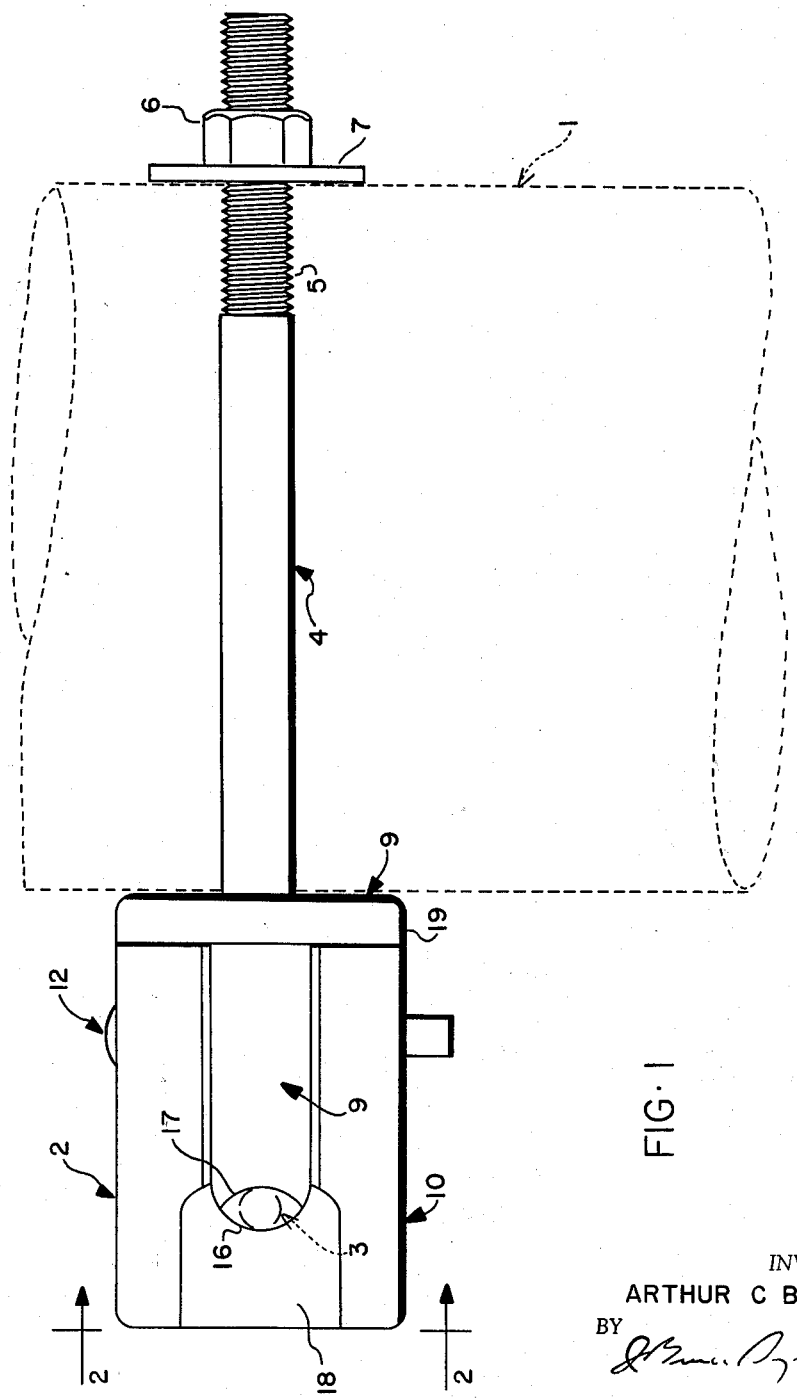
FIG. 1 is a side view of an electrical insulator embodying the invention, showing fragmentarily in dotted lines a pole having the insulator applied to one side thereof, and showing in dotted lines an electrical conductor operatively connected to the insulator whereby it is secured to the pole.

Referring to FIGS. 1 to 6 of the drawing, the numeral 1 designates generally a pole, which is shown fragmentarily in dotted lines, having an electrical insulator embodying the invention, indicated generally by the numeral 2, applied to one side thereof, and the numeral 3 indicates generally an electrical conductor, shown in dotted lines, which is operatively connected to the insulator 2 whereby it is removably secured to the pole 1.

The insulator 2 includes an elongated bolt 4 having a threaded end portion 5 which is passed thru a hole (not shown) extending transversely thru the pole 1 and has a nut 6 and a washer 7 applied thereto, and having a flattened, enlarged end portion 8 which extends outwardly from the side of the pole 1 opposite the nut 6 for attachment of an assembly as hereinafter described whereby the conductor 3 is removably secured to the pole 1.

The assembly above referred to includes an elongated inner clamping element and a bifurcated outer clamping element, designated generally by the numerals 9 and 10, respectively, which are formed of molded plastic material such as nylon which is characterized by its toughness and durability.

As shown best in FIGS. 3 and 4, the elongated inner clamping element 9, which is generally cylindrical and has a central axial bore 11 beginning at one of its ends, is received on the flattened, enlarged end portion 4 of the bolt 8, and advantageously may be cemented thereto temporarily for convenience in assembling the insulator 2 and attaching it to the pole 1.

The bifurcated outer clamping element 10, which likewise is generally cylindrical, is received on the outer end of the elongated inner clamping element 9 and is secured thereto by a key pin 12 as hereinafter described.

The bifurcated outer clamping element 10 has opposite side portions which embrace the elongated inner clamping element 9 and is arranged concentrically and coaxially relative thereto.

The key pin 12 extends transversely thru aligned holes 13 in opposite side portions of the bifurcated outer clamping element 10 and a hole 14 in the bolt 4, and thru longitudinal slots 15 in opposite sides of the elongated inner clamping element 9 communicating with the bore 11, whereby the bifurcated outer clamping element 10 is connected to the bolt 4 in axially adjustable relation to the elongated inner clamping element 9.

The key pin 12 is secured against displacement by tension applied thereto upon tightening the nut 6, as hereinafter described, and may be additionally secured by means of a cotter pin (not shown) passed thru one of its ends.

The conductor 3, which is passed between opposite side portions of the bifurcated outer clamping element 10, is clamped between mutually opposing grooves 16, 17, one of which is formed in the bifurcated outer clamping element 10 and extends transversely thereof, between its opposite side portions, and the other of which is formed in the adjacent end of the elongated inner clamping element 9.

The groove 16 of the bifurcated outer clamping element 10 is extended longitudinally along opposite sides thereof, as at 18, to provide a continuous channel for engagement by the electrical conductor 3.

Upon tightening the nut 6 the bolt 4 is detached from the elongated inner clamping element 9, to which it is cemented as above described, and the bifurcated outer clamping element 10 is advanced longitudinally relative to the elongated inner clamping element 9 whereby the electrical conductor 3 is securely clamped between the inner and outer clamping elements 9 and 10.

The inner end of the elongated inner clamping element 9, which is flanged radially outwardly, as at 19, abuts the pole 1 upon tightening the nut 6 and provides a bearing surface for the insulator 2 whereby it is additionally supported.

Figure 7:
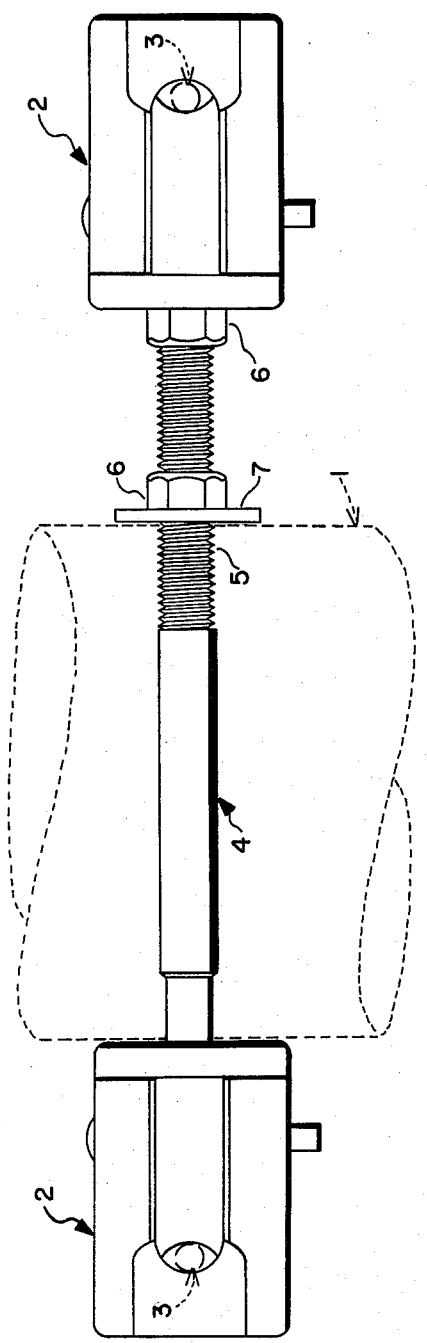
FIG. 7 is a view similar to FIG. 1 showing a modified form of the invention in which a second insulator is applied to the opposite side of the pole.
Figures 8, 9:
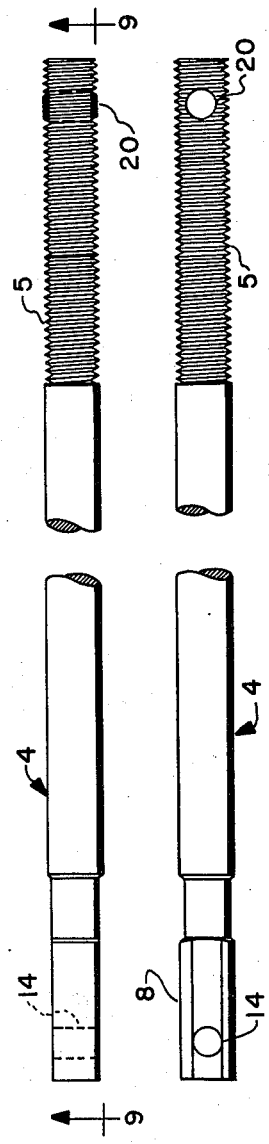
FIGS. 8 and 9 are longitudinal views showing details of construction of the bolt whereby two insulators are attached to opposite sides of the pole as illustrated in FIG. 7.
Figure 14:
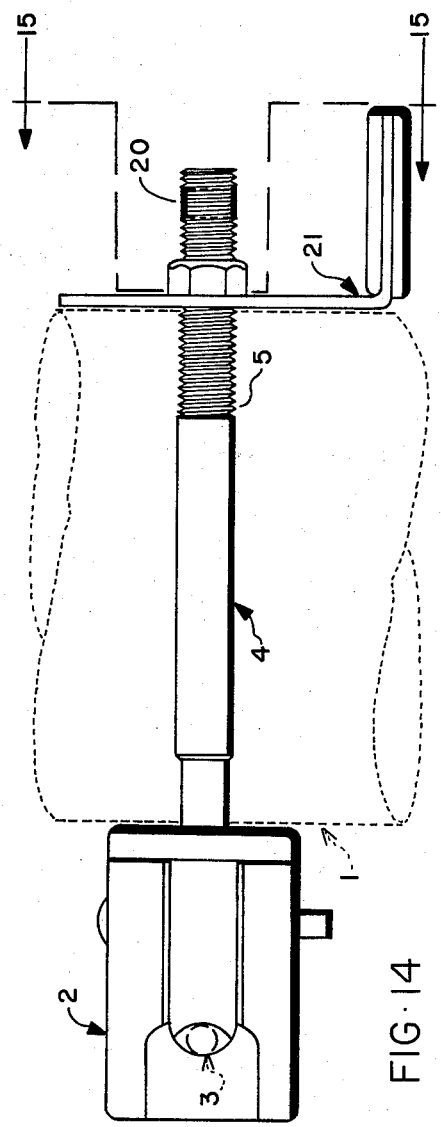
FIG. 14 is a view similar to FIG. 7, showing the second insulator removed and showing the addition of a bracket similar to the bracket shown in FIGS. 10 to 13 to the threaded end of the relatively larger diameter bolt illustrated in FIGS. 7 to 9.
Figure 17:
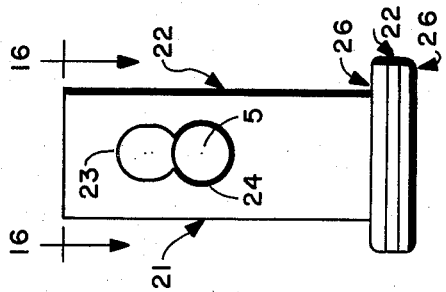
FIGS. 15 to 17 are views showing details of construction of the bracket and its relation to the threaded end of said bolt.
Figure 16:
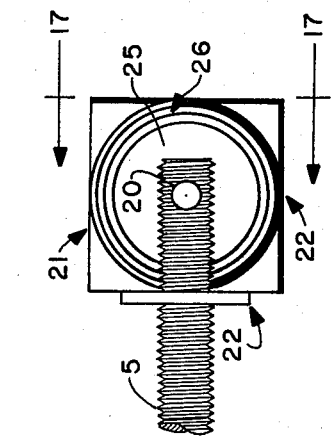
Figure 15:
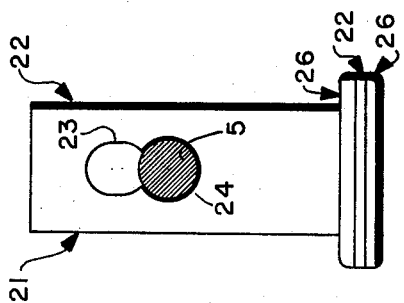

As shown in FIGS. 7 to 9, the threaded end 5 of the bolt 4 is enlarged and has a diameter corresponding to the maximum width of the flattened end portion 8 thereof. A hole 20, which is formed in the threaded end 5 of the bolt 4, corresponds to the hole 14 in the opposite end thereof.

A second insulator 2 is applied to the threaded end 5 of the bolt 4, on the opposite side of the pole 1 from the insulator 2 shown in FIGS. 1 to 6. The second insulator 2 is secured in its adjusted position relative to a second electrical conductor 3, shown in dotted lines, by a second nut 6 which is applied to the threaded end 5 of the bolt 4.

FIGS. 10 to 13 show an arrangement in which a bracket as hereinafter described, which is designated generally by the numeral 21, is applied to the bolt 4 between the pole 1 and the first mentioned insulator 2, and FIGS. 14 to 17 show a similar arrangement in which a bracket 21 is applied to the threaded end 5 of the larger diameter bolt 4 shown in FIGS. 7 to 9, between the pole 1 and the first mentioned nut 6.

The bracket 21, which is intended for use as an anchor for securing a service line which is to be connected to one of the electrical conductors 3, as illustrated in FIGS. 1 to 6, and 7 to 9, respectively, consists of a right angularly bent metal strap 22 having a pair of shaped, mutually intersetting holes 23, 24 in one of its end portions for engagement by the flattened end portion 8 and the threaded end portion 5 of the bolt 4, respectively, and an opening 25 in its opposite end portion, in which is received an insert 26 formed of molded plastic material which is a non-conductor of electricity, for engagement by a service line.

The hole 23 is elongated whereby the flattened end portion 8 of the bolt 4 may be passed thru it upon rotating the bolt 4 whereby its flattened end portion 8 is aligned with the hole 23.

The arrangement above described serves to secure the bracket 21 in engagement with the pole 1 upon tightening the first mentioned nut 6 in the absence of the first mentioned insulator 2.

FIGS. 18 to 20 show a modified form of the invention in which a bifurcated outer clamping element 27, which corresponds to the bifurcated outer clamping element 10 shown in FIGS. 1 to 4, consists of an angularly bent, substantially U-shaped metal member 28, which is channel shaped in transverse section and has an insert 29, formed of molded plastic material which is a non-conductor of electricity, for engagement by an electrical conductor such as the electrical conductor 3.

The leg portions of the U-shaped member 28 have holes 30 therein for engagement by a key pin such as the key pin 12 shown in FIGS. 1 to 4. The insert 29 has grooved surfaces 31, 32 therein corresponding to the grooved surfaces 16, 18.

The invention may be modified in various ways without departing from the spirit and scope thereof.

I claim:

1. An electrical insulator for attachment of a power line to one side of a pole comprising, in combination with a bolt having dimensions whereby it is adapted to be passed thru an opening therefor extending transversely thru a pole, said bolt having a threaded end portion and having a hole extending transversely thru one of its ends, an elongated first clamping element having a longitudinal bore beginning at one of its ends and having longitudinal slots in opposite sides thereof communicating with said bore, the first clamping element being received on the bolt with said one of the ends of the bolt inserted in said bore, a bifurcated second clamping element received on an end portion of the first clamping element opposite said one of its ends, the second clamping element having opposite side portions embracing the first clamping element and being arranged concentrically and coaxially relative thereto, a pin arranged transversely of the bolt and extending thru said hole, and thru aligned openings therefor in the opposite side portions of the second clamping element and the longitudinal slots of the first clamping element whereby the first and second clamping elements are connected to the bolt for axial adjustment relative to each other, the second clamping element having a transverse groove extending between its opposite side portions for engagement by an electrical conductor and the first clamping element having a transverse groove in its adjacent end portion in opposing relation to said first mentioned groove, and a nut on the threaded end portion of the bolt whereby the first and second clamping elements are adapted to be advanced relative to each other upon tightening the nut.

2. The structure of claim 1, the first and second clamping elements being formed of molded plastic material characterized by its toughness and durability, and which is a non-conductor of electricity.

3. The structure of claim 1, the second clamping element including a U-shaped member, formed of metal, defining its exposed end portion and two opposite sides thereof, and having a molded insert, formed of plastic material characterized by its toughness and durability, and which is a non-conductor of electricity, positioned between opposite side portions of the U-shaped member, the molded insert having grooved surfaces extending transversely thereof and longitudinally along two opposite sides for engagement by an electrical conductor.

4. The structure of claim 1, and an angular bracket for attachment to the bolt on one side of the pole for use in securing a service line thereto.

References Cited in the file of this patent

UNITED STATES PATENTS

| 48,906 | Cauvet | July 25, 1865 |
| 1,625,645 | Fort | Apr. 19, 1927 |
| 2,050,898 | Seelye | Aug. 11, 1936 |

FOREIGN PATENTS

| 243,806 | Great Britain | Dec. 4, 1925 |